United States Patent [19]

Toncelli

[11] Patent Number: 4,716,057
[45] Date of Patent: Dec. 29, 1987

[54] PROCESS FOR THE PREPARATION OF PUTTY FOR USE IN COATING, INCLUDING AUTOMATIC COATING OF SLABS OF MARBLE OR STONE AND THE LIKE UNDER VACUO IN TWO SEPARATE CONTAINERS

[76] Inventor: Marcello Toncelli, Via Giovanni XXIII,, 2 Bassano Del Grappa, Vicenza, Italy

[21] Appl. No.: 911,484

[22] Filed: Sep. 25, 1986

[30] Foreign Application Priority Data

Sep. 30, 1985 [IT] Italy .................................. 85601 A/85

[51] Int. Cl.$^4$ ............................................. B05D 3/02
[52] U.S. Cl. .................................... 427/393.6; 106/33; 427/404; 427/514; 523/514; 524/906
[58] Field of Search ...................... 427/393.6; 106/33; 427/404; 523/514; 524/906

[56] References Cited

U.S. PATENT DOCUMENTS

| | | | |
|---|---|---|---|
| 3,849,367 | 11/1974 | Mayer et al. | 523/514 |
| 4,092,290 | 5/1978 | Bowser | 524/906 |
| 4,520,045 | 5/1985 | Kutsuna et al. | 427/294 |
| 4,548,992 | 10/1985 | Doi et al. | 525/939 |
| 4,600,738 | 8/1986 | Lamm et al. | 523/514 |
| 4,624,725 | 11/1986 | Lamm et al. | 524/906 |

*Primary Examiner*—Thurman R. Page
*Assistant Examiner*—L. R. Horne
*Attorney, Agent, or Firm*—Bucknam and Archer

[57] ABSTRACT

The two components of the putty, one containing the accelerator and the other containing the catalyst, are placed in two separate containers under vacuo. After the preparation is complete the containers are brought first to atmospheric pressure and then to high pressure in order to favor the removal of the two materials from the containers onto the slab to be coated. The two components are then mixed on the slab forming the putty suitable for coating slabs of marble, stone and the like.

1 Claim, 3 Drawing Figures

PROCESS FOR THE PREPARATION OF PUTTY FOR USE IN COATING, INCLUDING AUTOMATIC COATING OF SLABS OF MARBLE OR STONE AND THE LIKE UNDER VACUO IN TWO SEPARATE CONTAINERS

The present invention relates to a method for the preparation of the two main components of a putty under vacuo within separate containers and more specifically the putty to be used in the coating of slabs of marble or stone and the like.

It is well known that in the present state of the art the coating of slabs of marble or stone in general cannot be carried out automatically because of the rapidity with which the putty hardens with the consequent clogging of various devices so that automatic devices for the coating of the slabs cannot be used almost immediately. For this reason, the coating operation is carried out manually and the preparation of the putty is carried out in small quantities within a container or even better, over the slab being treated. During the preparation, the putty incorporates air which has the tendency to escape slowly, thus causing, after the putty has been spread, some shrinking or pores in the putty itself.

The crux of the present invention resides in the preparation under vacuo within two separate containers of the two components of the putty of which the first one consists mainly of resins, for instance polyester resin, a catalyst, calcium carbonate, silica gel and/or a few other elements in appropriate proportions and the second component consists mainly of resins such as polyester resins, accelerators, calcium carbonate, and silica gel in appropriate proportions. The two components separately prepared do not present the hardening problem so that they may be prepared in the desired quantities and the containers being used, the tubings and dosing devices do not require constant and methodical cleaning. After the containers are filled with the various components, they are evacuated and the components are carefully mixed in the containers to obtain homogeneous mixtures. After the mixing is completed, the container is brought back to atmospheric pressure and afterwards by means of compressed air, the pressure is raised for the purpose of favoring the removal of the components of the putty from the containers.

The two components thus prepared are ready to be poured on the slab by means of suitable control valves which close and open the conduits which lead from the containers to the slab. After the necessary amounts for the purpose of coating the slab are poured onto the slab, the components are mixed during the spreading operation on the slab itself, an operation which is carried out in general by means of rotating heads which have paddles.

In accordance with the present invention, therefore, it is possible to avoid contact up to the time of coating of the two components and consequently it is possible to avoid the rapid hardening of the mixture. Even more significant, it is possible to avoid, during the preparation, the incorporation of air which subsequently has a tendency to escape thus causing shrinking and pores in the putty already spread.

BRIEF DESCRIPTION OF THE DRAWINGS

The invention will now be described by reference to the accompanying drawings of which.

Figure 1:
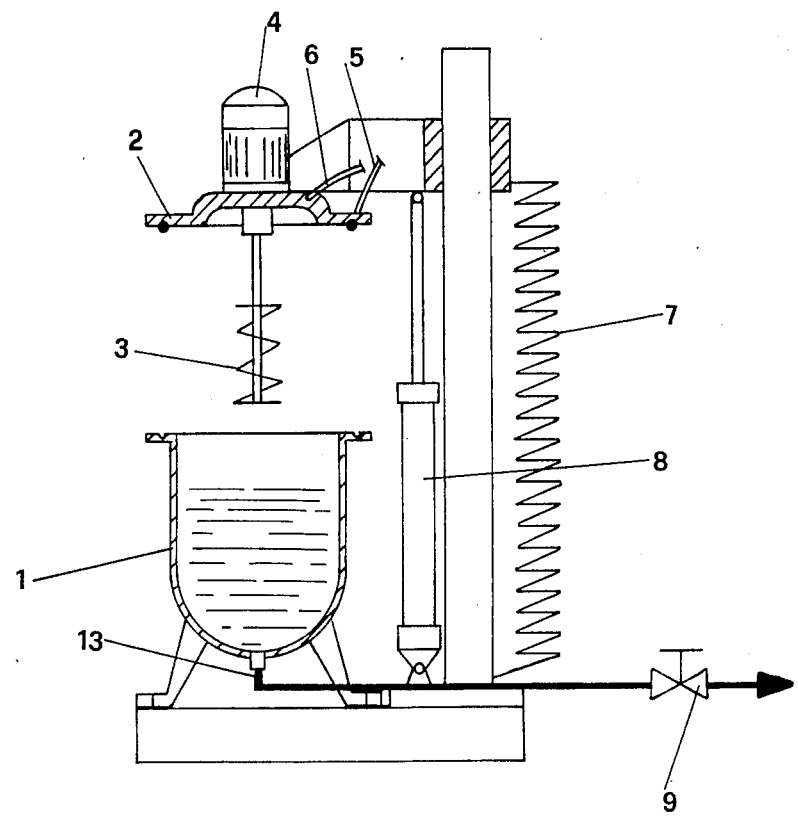
FIG. 1 is a schematic side sectional view of one of the containers being used for holding the mixture.
Figure 2:
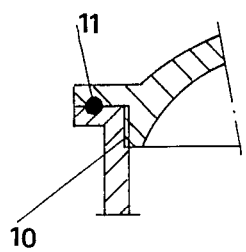
FIGS. 2 and 3 are two variations of the manner of closing the container.
Figure 3:
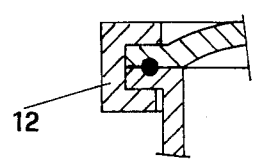

The container 1, together with its cover 2, is provided with a rotating mixer 3 actuated by electric motor 4. The container is also provided with conduit 5 for removal of air and conduit 6 for the introduction of compressed air. The pneumatic cylinder 8 is used for opening and closing the container. The container is evacuated by means of conduit 7, then by means of conduit 13, the material in the container is removed and is introduced onto the slab being worked by means of control valve 9. Container 1 and cover 2 may be sealed together in a variety of manners, for instance by means of threading 10 with packing gasket 11 as shown in FIG. 2, the packing gasket being located on the flanges or by means of half-rings 12 suitable for gripping as shown in FIG. 3 which are connected among themselves in a hinge fashion and which are closed by suitable means.

The advantages according to the present invention are clear because it is possible to obtain two components which are mixed in an environment which is air free and may be kept in the liquid state under air pressure. The components are separately spread on the slab being coated to form the final product which has the tendency to harden but they are kept separate up to the time when the final product is being used for coating the slabs.

What is claimed is:

1. A method of coating a slab of marble, stone which consists of mixing in a first container the ingredients of the first component of a putty, said first component comprising polyester resins, calcium carbonate, silica gel and a catalyst, evacuating the container and mixing said ingredients under vacuo to obtain an homogeneous mixture, introducing into a second container the ingredients of the second component of the putty which contains the accelerator, said ingredients comprising a polyester resin, calcium carbonate and silica gel, evacuating the second container and mixing said ingredients therein under vacuum, introducing compressed air into the containers, removing only the desired quantities of each of said components at the time of use and causing said desired quantities to be spread directly onto the slab being coated whereby the premature hardening of the putty and the incorporation of air are avoided.

* * * * *